(12) United States Patent
Rodman

(10) Patent No.: US 8,834,782 B2
(45) Date of Patent: Sep. 16, 2014

(54) COMPOSITE STRUCTURES AND METHODS OF MAKING SAME

(76) Inventor: William L. Rodman, Bellevue, WA (US)

( * ) Notice: Subject to any disclaimer, the term of this patent is extended or adjusted under 35 U.S.C. 154(b) by 1410 days.

(21) Appl. No.: 11/835,261

(22) Filed: Aug. 7, 2007

(65) Prior Publication Data

US 2009/0041972 A1    Feb. 12, 2009

(51) Int. Cl.
| | |
|---|---|
| *B29C 70/48* | (2006.01) |
| *B29C 70/44* | (2006.01) |
| *B29C 70/46* | (2006.01) |
| B29K 105/24 | (2006.01) |
| B29L 22/00 | (2006.01) |
| *B29C 70/54* | (2006.01) |

(52) U.S. Cl.
CPC .............. *B29C 70/44* (2013.01); *B29C 70/443* (2013.01); *B29K 2105/246* (2013.01); *B29L 2022/00* (2013.01); *B29C 70/547* (2013.01); *B29C 70/46* (2013.01); *B29C 70/548* (2013.01)
USPC .......................................... 264/572; 264/544

(58) Field of Classification Search
USPC .................. 264/544, 553, 554, 571, 572, 314
See application file for complete search history.

(56) References Cited

U.S. PATENT DOCUMENTS

| | | | |
|---|---|---|---|
| 4,212,621 A | 7/1980 | Michelotti | |
| 4,363,617 A | 12/1982 | Hirsekorn | |
| 4,822,272 A | 4/1989 | Yanase et al. | |
| 5,000,990 A * | 3/1991 | Freeman | 428/36.1 |
| 5,454,895 A * | 10/1995 | Imparato | 156/156 |
| 5,484,277 A | 1/1996 | Lindsay | |
| 5,593,633 A | 1/1997 | Dull et al. | |
| 5,904,972 A * | 5/1999 | Tunis et al. | 428/178 |
| 5,909,414 A | 6/1999 | Ohta | |
| 6,071,460 A * | 6/2000 | Renaudin et al. | 264/314 |
| 6,159,414 A | 12/2000 | Tunis et al. | |
| 6,257,858 B1 | 7/2001 | Pabsch et al. | |
| 6,286,785 B1 * | 9/2001 | Kitchen | 244/121 |
| 6,506,325 B1 * | 1/2003 | Cartwright | 264/40.6 |
| 6,533,985 B1 | 3/2003 | Smith | |
| 6,773,655 B1 | 8/2004 | Tunis et al. | |
| 6,796,784 B1 | 9/2004 | Andre | |

(Continued)

FOREIGN PATENT DOCUMENTS

| | | |
|---|---|---|
| EP | 0234341 | 2/1986 |
| EP | 0234341 | 9/1987 |
| EP | 1234654 | 8/2002 |

(Continued)

*Primary Examiner* — Galen Hauth
(74) *Attorney, Agent, or Firm* — Richard C. Vershave; Foster Pepper PLLC

(57) ABSTRACT

A complex-shaped, three-dimensional fiber reinforced composite structure may be formed by using counteracting pressures applied to a structural lay-up of fiber plies. The fiber plies are arranged on a pressurizable member that may become an integral part of the final product, or may be removed before the product is finalized. The pressurizable member may take the form of a hollow blow molded or rotomolded thermoplastic component or a superplastic formed metallic component having an opening such that the pressurizable member may be vented or pressurized and thus expanded against the fiber plies. In addition, a number of the pressurizable members may be joined in fluid communication, where they may each have different configurations, yet be arranged to form a large, complex-shaped lay-up surface for the fiber plies. The arrangement of the fiber plies onto the pressurizable members may produce integral I-Beam stiffeners, ribs, flanges, and other complex shaped structural components.

16 Claims, 6 Drawing Sheets

(56) References Cited

U.S. PATENT DOCUMENTS

| | | |
|---|---|---|
| 6,818,159 B2 | 11/2004 | Hinz |
| 6,896,841 B2 | 5/2005 | Velicki et al. |
| 2004/0183227 A1* | 9/2004 | Velicki et al. ................ 264/236 |
| 2007/0096368 A1* | 5/2007 | Hanson et al. ................ 264/314 |
| 2007/0175577 A1 | 8/2007 | Dagher et al. |

FOREIGN PATENT DOCUMENTS

| | | |
|---|---|---|
| EP | 1602470 | 12/2005 |
| WO | 9904964 | 2/1999 |
| WO | WO99/04964 | 2/1999 |
| WO | 2005105417 | 11/2005 |
| WO | WO2005/105417 | 11/2005 |

* cited by examiner

COMPOSITE STRUCTURES AND METHODS OF MAKING SAME

PRIORITY CLAIM

Field of the Invention

The invention is generally related to producing large, complex-shaped, three-dimensional, fiber reinforced composite components and structures, such as composite components and structures where the requirements for surface finish, strength and damage tolerance are high.

BACKGROUND OF THE INVENTION

A composite component is a term generally used to describe any part consisting of at least two constituents that are combined yet retain their physical and chemical identities. One type of composite component is a particulate reinforced composite (PRC) in which particulates of a selected material are embedded or bonded into a matrix. An advanced composite component is a term generally used to describe fibers of high strength and modulus embedded in or bonded to a matrix, such as a resin, metal, ceramic, or carbonaceous matrix. The fibers may be continuous fibers, short fibers, or whiskers. The resin type matrix may be a polymerized synthetic or a chemically modified natural resin, which may include but is not limited to thermoplastic materials such as polyvinyl, polystyrene, and polyethylene and thermosetting materials such as polyesters, epoxies, and silicones. Typically, a distinct interface or boundary is present between the fibers and the matrix material. It is appreciated that the composite component produces a combination of properties that cannot be achieved with either of the constituents acting alone.

A composite component is typically produced by a multi-step process that begins by laying up the fibers generally in swatches of material known as laminates or plies on an impervious surface. To form the matrix about the fiber plies, the plies may be pre-impregnated with the matrix material or may be un-impregnated. The un-impregnated fibers may be embedded or bonded in the matrix material by using injection molding, reaction injection molding (RIM), resin infusion, or other matrix embedding or bonding techniques. Once the fiber plies are arranged in a desired configuration, compaction techniques such as vacuum bagging are advantageously employed to remove voids from the fiber plies. The matrix material surrounding the plies may be cured employing ovens, electron beams, ultraviolet, infrared light sources, autoclave cured. Curing may be carried out at room (i.e., ambient) or elevated temperatures.

One existing manufacturing process for producing large, complex-shaped, three-dimensional, fiber reinforced composite components and structures includes arranging fiber plies arranged on plaster mandrels to form the complex shape. Fiber reinforced plies are laid up and impregnated on the plaster mandrels, which have been previously varnished to seal them. The resulting structure is vacuum bagged and cured. The plaster mandrel is removed by striking it through the laid up, crumbling the plaster mandrel to leave the hollow composite component. This technique is commonly used to produce structures such as complex-shaped, air conditioning ducts. This type of tooling may include locking features that hold the tool's complex shape.

If the strength of the component is at issue, steel, aluminum, or invar tooling materials may be used to create shapes that can be fastened or otherwise coupled together to create a mold surface for laying up the fiber plies. For example, an auxiliary power unit inlet duct for an airplane typically requires structural materials that exceed the strength requirements obtainable from the plaster mandrel techniques described above.

Another method of producing large composite core structures formed by vacuum assisted resin transfer molding is described in U.S. Pat. No. 6,159,414 to Tunis, III et al. (Tunis). Tunis describes making composite structures by employing hollow cell or foam block cores. The cores may be wrapped with a fiber material and arranged in a mold such that the fiber material forms a face skin. The assembly is sealed under a vacuum bag to a mold surface. One or more main feeder conduits communicate with a resin distribution network of smaller channels which facilitates flow of uncured resin into and through the fiber material. The resin distribution network may comprise a network of grooves formed in the surfaces or the cores and/or rounded corners of the cores. The network of smaller channels may also be provided between the vacuum bag and the fiber material, either integrally in the vacuum bag or via a separate distribution medium. Resin, introduced under vacuum, travels relatively quickly through the main feeder channel(s) and into the network of smaller channels. After penetrating the fiber material to reach the surface of the cores, the resin again travels relatively quickly along the cores via the grooves in the cores or the spaces provided by the rounded corners to penetrate the fiber material wrapped around and even between the cores. The resin is then cured after impregnating the fiber material to form a three-dimensional, fiber reinforced composite component and structure.

One drawback of employing the cores as taught by Tunis is that the cores are sealed or non-vented, which means the component must be cured at room temperature. More specifically, the ideal gas law states that pressure inside a closed volume is directly proportional to temperature. If the resin is cured at an elevated temperature, such as by putting the component in an oven or an autoclave, each trapped gas within each core would build up pressure and that pressure would likely distort the core r even possibly explode it.

SUMMARY OF THE INVENTION

The present invention generally relates to complex-shaped, three-dimensional fiber reinforced composite components and structures and methods of making the same using autoclave, oven or other techniques. One aspect of the invention provides a method for manufacturing complex-shaped, three-dimensional composite structures using counteracting acting pressures applied to a structural lay-up of fiber plies. Advantageously, the complex-shaped, three-dimensional composite structures may be formed to include stiffening, strengthening, or other desired engineering features, for example outstanding flanges, joint reinforcements, and integral I-beam stiffeners.

In accordance with an aspect of the invention, a method of making a composite structure includes obtaining a pressurizable member having sufficient rigidity for supporting fiber plies thereon in a desired shape before pressurization. The pressurizable member has an outer surface and an inner surface which form a wall that defines a volumetric region. The pressurizable member also has an opening to permit pressurization of the pressurizable member. Pre-impregnated or un-impregnated fiber plies are arranged on the outer surface of the pressurizable member and placed into a mold. The mold is sealed to permit pressurization of the fiber plies. If un-impregnated fiber plies are used, a matrix material may be injected or infused into the fiber plies to sufficiently impregnate the fiber plies within the mold. A first surface of the fiber plies is pressurized with a first pressure. The inner surface of the pressurizable member is pressurized when air is introduced through the opening with a second pressure so that the first pressure and the second pressure cooperate to compress the resin-impregnated fiber plies between the mold and the pressurizable member. In one embodiment, the first pressure and the second pressure are equivalent.

In accordance with another aspect of the invention, a composite structure includes a pressurizable member having sufficient rigidity for supporting fiber plies thereon in a desired shape before pressurization, the pressurizable member having an outer surface and an inner surface forming a wall that defines a volumetric region; and fiber plies arranged over at least a portion of the outer surface of the pressurizable member, the fiber plies compressed together due to a combination of a first pressure previously applied to an exterior surface of the fiber plies and a second pressure previously applied to the inner surface of the pressurizable member. The fiber plies may be impregnated with a matrix material or un-impregnated. If the latter, then an amount of matrix material may be injected or infused into and cured with the fiber plies. In one embodiment, the fiber plies are adhesively bonded to the pressurizable member.

BRIEF DESCRIPTION OF THE DRAWINGS

Preferred and alternative embodiments of the present invention are described in detail below with reference to the following drawings.

DETAILED DESCRIPTION OF THE PREFERRED EMBODIMENT

A complex-shaped, three-dimensional fiber reinforced composite structure may be formed by using counteracting acting pressures applied to a structural lay-up of fiber plies. The fiber plies are arranged on a pressurizable member. The pressurizable member may become an integral part of the final product, or may be removed, depending on the accessibility of the member. In a preferred embodiment, the pressurizable member is a hollow rotomolded thermoplastic member, a blow molded thermoplastic member, a superplastic formed metallic member, or a twin sheet vacuum formed member (TSVF) having an opening or vent. The opening or vent allows an inner surface of the pressurizable member to be vented or pressurized such that it is expanded or inflated against the fiber plies. Advantageously, the vented pressurizable member allows the complex-shaped, three-dimensional fiber reinforced composite structure to be produced using elevated temperature, pressure, and/or autoclave techniques. By means of the opening, pressure within the pressurizable members may be equalized as temperature rises or additional pressure may be applied, as in the use of an autoclave. In one embodiment, a number of the pressurizable members, which may be of different sizes and have complex shapes, are arranged to form a large, complex-shaped lay-up surface for the fiber plies.

The ability to equalize the pressure in the pressurizable members allows for the production of complex-shaped, three-dimensional structures such as frames, intercostals, ribs, etc. and further permits the fiber plies to maintain their correct geometric shape.

Figure 1A:
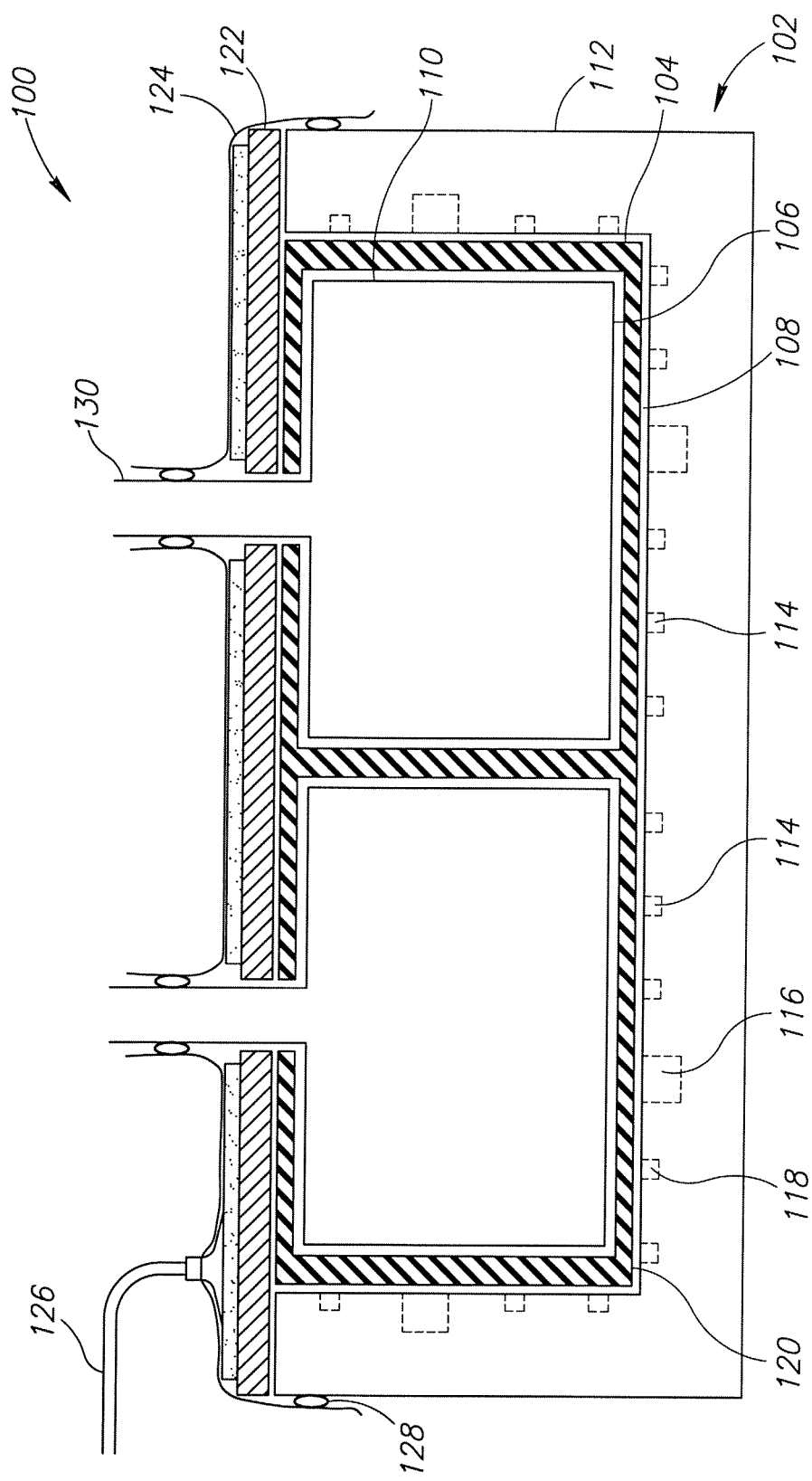
FIG. 1A schematically shows a method of making a complex shaped, three-dimensional composite structure in a mold optionally having resin feeder grooves where fiber plies are arranged on sufficiently rigid pressurizable members and pressurized within the mold using a bagging film according to an embodiment of the invention.

FIG. 1A schematically shows an autoclave system 100 having a tooling assembly or mold 102 according to an embodiment of the invention. Fiber plies 104 are arranged on pressurizable members 106 and the resulting assembly 108 is placed in the mold 102. The arrangement of the fiber plies 104 and the manufacturing of the pressurizable members 106 will be described in greater detail below. For purposes of clarity only, the illustrated embodiment shows the outer surface 110 of the pressurizable members 106 as separated or spaced apart from the fiber plies 104. However during assembly, it is appreciated that the fiber plies 104 are laid up directly onto the outer surface 110 of the pressurizable members 106.

The mold 102 is a leak tight system having a mold body 112 optionally formed with feeder grooves or channels 114 to infuse matrix material (not shown) into or sufficiently wet the fiber plies 104. The feeder grooves 114 may include main feeder grooves 116 and distribution channels 118. Alternatively, the feeder grooves 114 may be included in the pressurizable members 106, which is an embodiment described below. However in many instances, it is preferable to include the feeder grooves 114 into the mold 102 to minimize matrix material pockets, uneven matrix material surfaces, or similar matrix material-related imperfections that could affect the quality of the finished fiber reinforced composite structure. For aerospace components, it is generally considered an unacceptable design condition to have matrix material pockets, uneven matrix material surfaces, or similar matrix material-related imperfections because such imperfections may increase the likelihood of cracking in the residual matrix material. Accordingly, it is preferable to form the feeder grooves 114 into the mold body 112. In one embodiment, the mold 102 is a tightly (i.e., close tolerance) machined clamshell type mold 102.

In one embodiment, a removable, stiffened peel ply 120 may be laid up or take the form as an outer layer or outer ply on the outer surface 110 of the fiber plies 104. The stiffened peel ply 120 could then be peeled or otherwise separated from the fiber plies 104 after the matrix material is cured. By way of example, the stiffened peel ply 120 permits the matrix material associated with the feeder grooves 114 to be peeled away from fiber plies 104 during finishing operations (i.e., post matrix material cure). There are numerous means of injecting or infusing the fiber plies 104 with matrix material and once a decision to use tool side feeder grooves 114 is made, the arrangement, volumetric flow rate, and volumetric capacity, for example, of the feeder grooves 114 may be optimized or otherwise controlled for the particular structural component being manufactured.

As temperature is increased, the different matrix materials may be utilized to achieve improved results. For example and when the matrix material comprises a resin, a number of different resins may be employed based on the processing temperature, for example a polyethylene resin may be used at low temperatures, an epoxy, phenolic, or bismaleimide resing at medium temperatures, and finally a polyimide resin at higher temperatures. In addition to the above, other resins such as nylon, polyethersulfone (PES), polyetherimide (PEI), or acetal may be used to customize the fiber-reinforced structure.

In the illustrated embodiment, the mold 102 further includes a caul sheet 122, a bagging film 124, and a probe 126. The caul sheet 122 may be coupled to the mold body 112 to secure the fiber plies 104 and the pressurizable members 106 within the mold 102. The caul sheet 122 may take the form of a sheet or plate material that is generally placed in immediate contact with the fiber plies 104 during curing to transmit normal pressure and provide a smooth surface on the finished component. In one embodiment, the caul sheet 122 takes the form of a stiffened, three ply sheet material, but may take other forms depending on the autoclave system 100 and other design considerations.

The bagging film 124 is sealed to various portions of the mold 102 with sealant 128. In addition, the bagging film 124 is sealed to sprues or pressure ports 130 extending from the pressurizable members 106. The bagging film 124 preferably takes the form of a three ply porous breather material, but may take other forms depending on the autoclave system 100 and other design considerations.

The probe 126 typically operates to place the fiber plies 104 under a vacuum pressure by removing air from the mold 102. In other embodiments, however, it is appreciated that the probe 126 may operate to increase the pressure within the mold 102. The bagging film 124 may also be sealed to the probe 126 using the sealant 128.

Figure 1B:
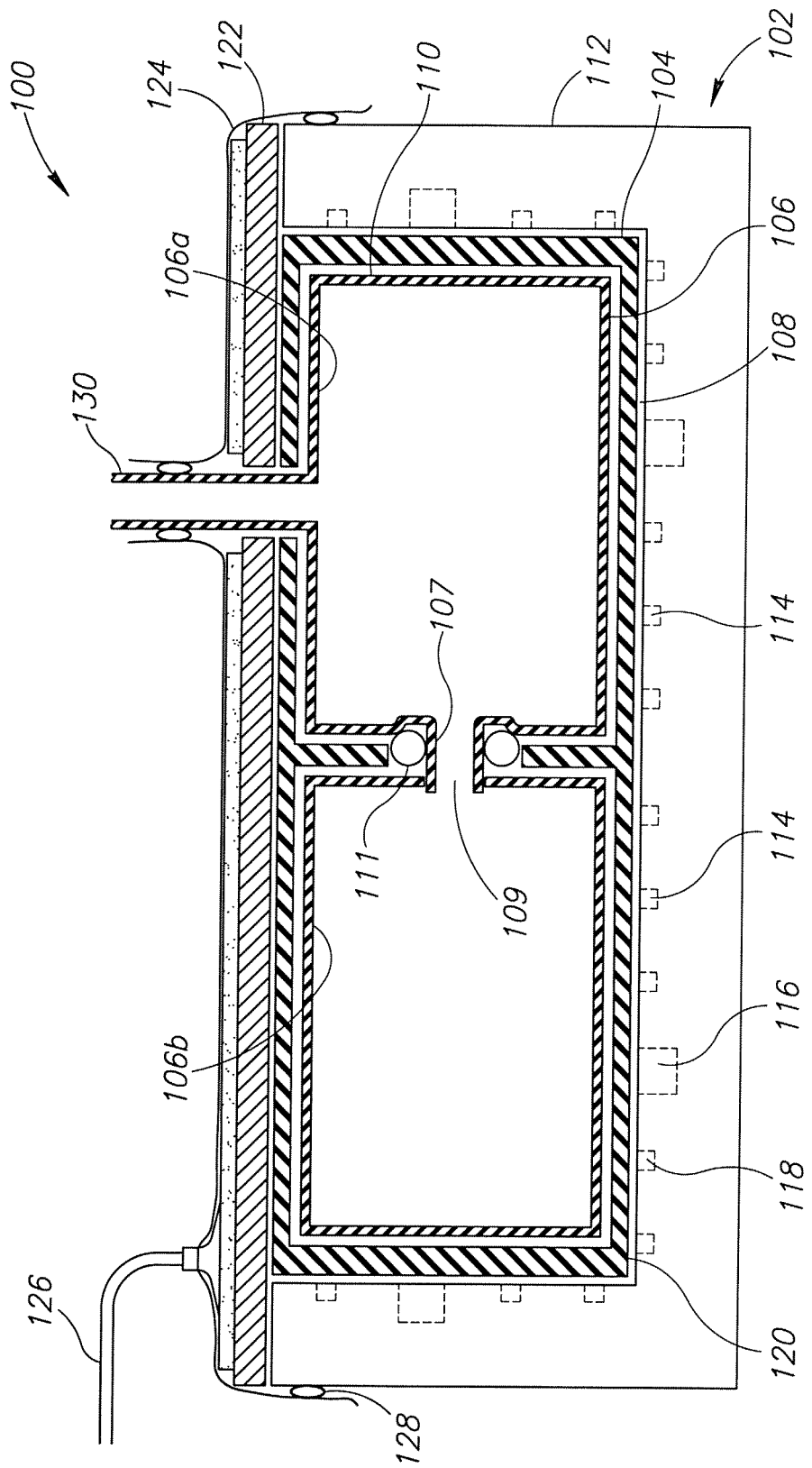
FIG. 1B schematically shows a method of making a complex shaped, three-dimensional composite structure in a mold where fiber plies are arranged on sufficiently rigid and interconnected pressurizable members within the mold according to an embodiment of the invention.

FIG. 1B schematically shows the autoclave system 100 having a tooling assembly or mold 102 according to another embodiment of the invention. The illustrated embodiment is substantially similar to the previous embodiment so that like numbers are re-used except where there are differences. In this embodiment, the fiber plies 104 are arranged on interconnecting pressurizable members 106a and 106b within the mold 102. Again and for purposes of clarity only, the illustrated embodiment shows an outer surface 110 of the pressurizable members 106a, 106b as separated or spaced apart from the fiber plies 104. However during assembly, it is appreciated that the fiber plies 104 are laid up directly onto the outer surface 110 of the pressurizable members 106a, 106b.

The interconnected pressurizable members 106a, 106b are in fluid communication with one another. As illustrated, pressurizable member 106a includes a first fluid port 107 that extends into a second fluid port 109 of pressurizable member 106b. In addition, the fiber plies 104 are arranged so they do not block or interfere with the ports 107, 109. As the pressure inside of pressurizable member 106a is changed via the single sprue 130, the pressure inside of pressurizable member 106b changes accordingly due to the fluid interconnection. To seal the pressurizable members 106a, 106b during pressurization, an amount of sealant 111 may be located around the first fluid port 107. Preferably, the sealant 111 is arranged so that it does not extrude into the fiber plies 104 during pressurization.

Figure 2:
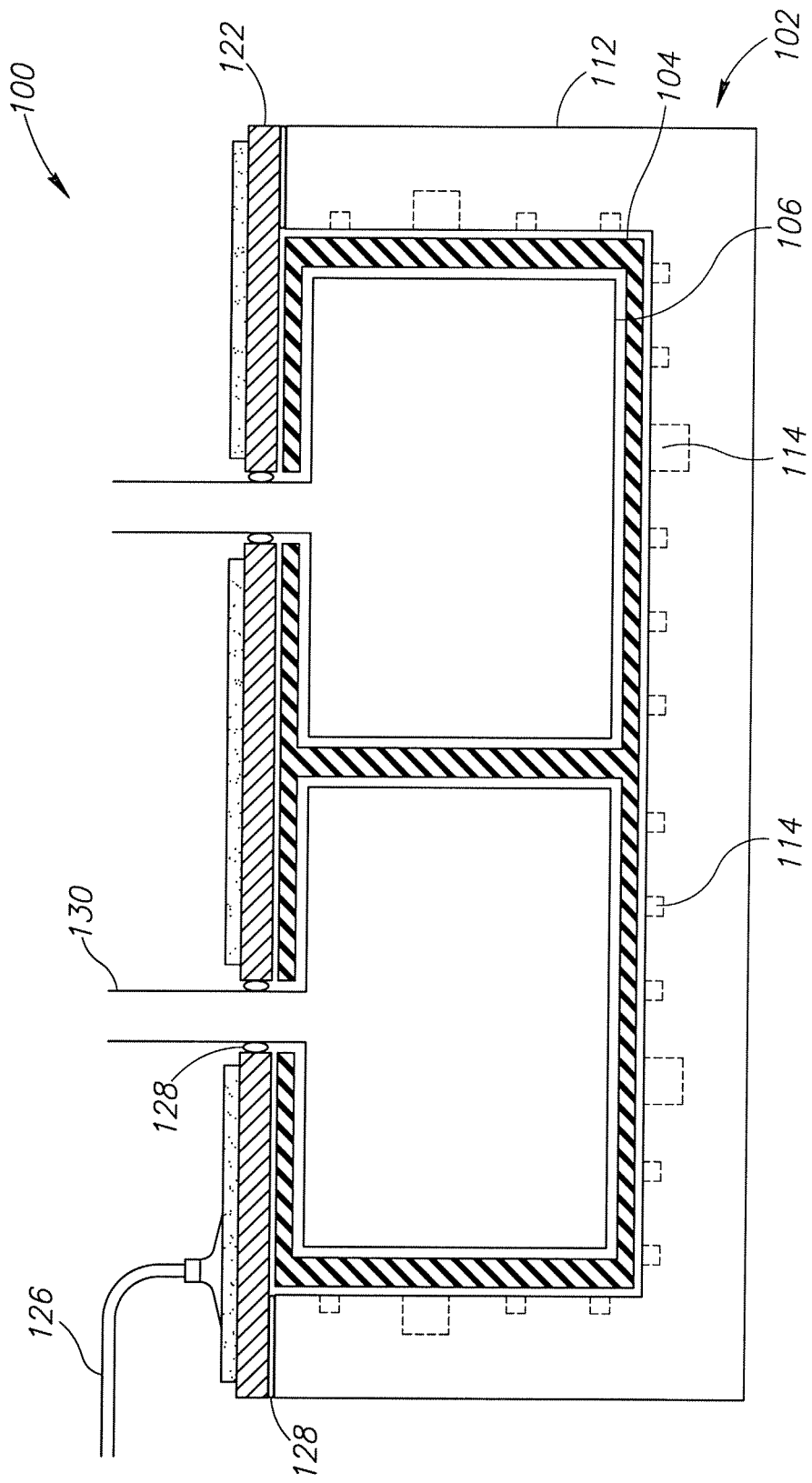
FIG. 2 schematically shows an alternative method of making a complex shaped, three-dimensional composite structure in a mold having resin feeder grooves where fiber plies are arranged on sufficiently rigid pressurizable members and pressurized within the mold using sealed mold halves according to an embodiment of the invention.

FIG. 2 shows a slightly different embodiment for pressurizing the autoclave system 100 without using the bagging film 124. In this embodiment, the caul sheet 122 is sealed against the mold body 112 of the mold 102 and the sprues 130 of the pressurizable members 106. It is appreciated that other autoclave system 100 configurations and methods of sealing the mold 102 may operate in accordance with the invention, but they will not be further described herein for purposes of brevity.

Figure 3:
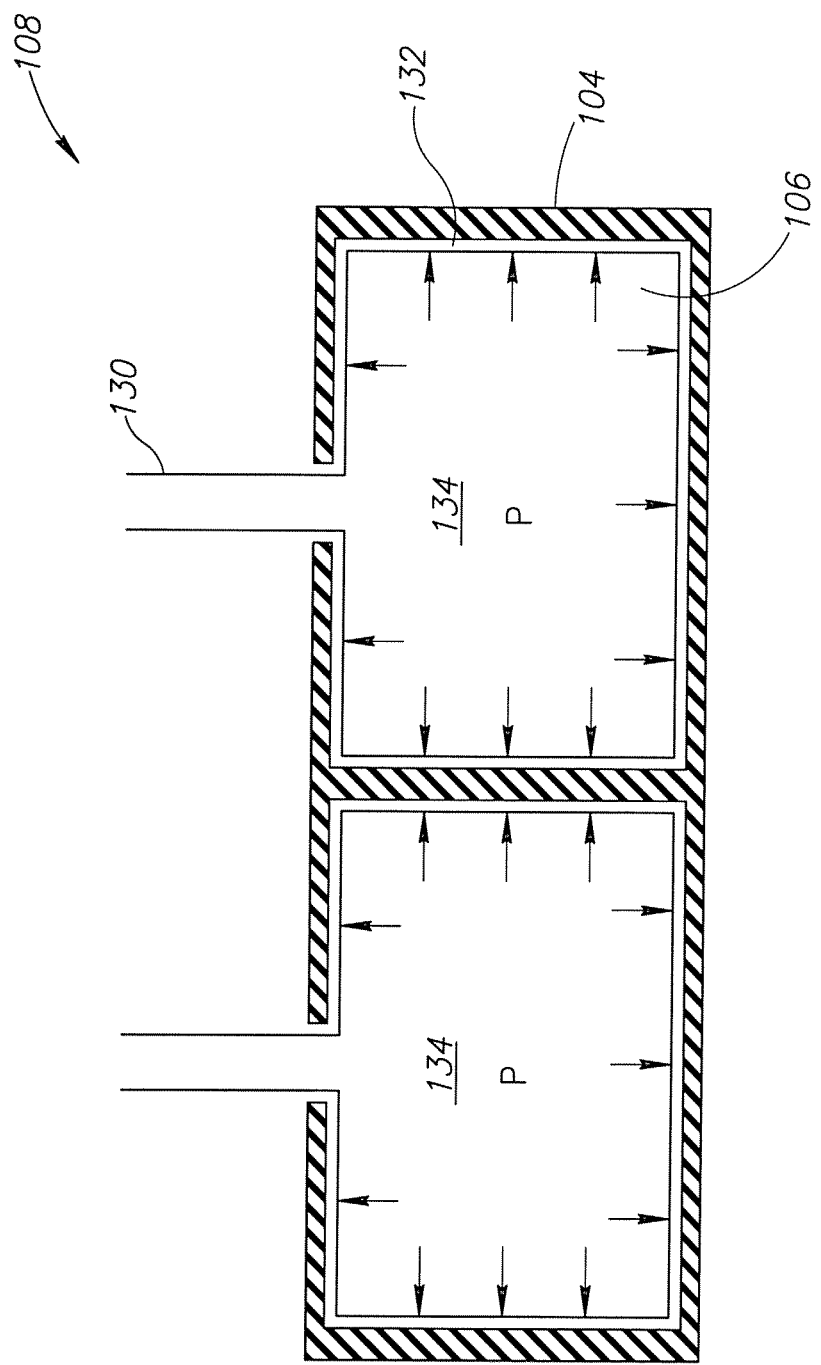
FIG. 3 shows the fiber plies arranged on the sufficiently rigid pressurizable members according to an embodiment of the invention.

FIG. 3 shows the assembly 108 comprising the fiber plies 104 and the pressurizable members 106. The pressurizable members 106 may be configured to be non-removable after the fiber plies 104 and injected or infused matrix material are cured. The integration of the pressurizable members 106 with the fiber plies 104 to make the flyaway component may or may not be accomplished by using a bondable material therebetween. When making complex flyaway components, it may be desirable to include the pressurizable members 106 as a permanent part of the flyway component. However, the type of material, the size, and the weight of the pressurizable members 106 would likely have to be closely controlled for the flyway component to meet its design requirements. For example, when making aerospace components, the thickness of the pressurizable members 106 will add to the overall weight of the flyway component. If the members 106 are too thin, or if they are not made of a durable material, then the bagging details may collapse, split or explode during pressurization and curing of the assembly 108 within the mold 102 (FIG. 1). Additionally, the presence of the pressurizable members 106 in contact with the fiber plies 104 could affect the engineering properties of the flyway component. In addition, the strength, properties, and structural reliability of the bondable material 132 will need to be tailored for each flyway component to minimize and preferably prevent crack propagation from the bondable material 132 into the cured fiber plies 104.

The pressurizable members 106 are preferably blow molded, TSVF or rotomolded thermoplastic materials with pressurizable inner chambers or volumetric regions 134. The pressurizable members 106 may be manufactured to have complex shapes, contours, and other features onto which the fiber plies 104 are arranged. Each pressurizable member 106 preferably includes at least one opening or sprue 130 to vent the hollow pressurizable member 106 to autoclave pressure or some other pressure "P." By pressurizing or venting the inner chamber 134, the pressurizable member 106 is urged against the un-cured fiber plies 104 to compress and sandwich the fiber plies 104 between the pressurizable member 106 and the mold 102. This ply compression operates to mitigate wrinkle formation in the flyway component. Because all member operate in unison and expand substantially uniformly the fiber plies are simultaneously placed in tension, which tends to minimize wrinkles in the produced component. In one embodiment, the pressurizable member may be produced from a chemically pure titanium tube in which the titanium tube is super plastically formed to create a metal matrix composite shape.

In one embodiment, the sprue 130 is used to introduce a pressure P into the chamber 134 that is greater than the autoclave pressure. After pressurizing and curing the fiber plies 104, the sprue 130 may vent gases built up in the chamber. By way of example, the sprue 130 may take the form of a fitting coupled to an air pump or other pressure source. In addition and depending on the arrangement of the assembly 108, the pressurizing and curing of the fiber plies 104 may be accomplished by pressurizing only the chambers 134 of the pressurizable members 106, thus eliminating the need for the bagging film 124 described in FIG. 1. In a preferred embodiment, impregnated (sometimes referred to as pre-impregnated) fiber plies 104 are arranged on the pressurizable member 106. The use of impregnated fiber plies may eliminate the step of injecting or infusing matrix material into the mold 102. In another embodiment, a resin transfer molding process is used to infuse resin into the fiber plies 104 and the pressurizable members 106 are pressurized without being placed in the mold 102.

In one embodiment, a plurality of pressurizable members 106 are coupled together to be in fluid communication with an adjacent pressurizable member 106 such that air, gas, or some other fluid may flow freely into one of the pressurizable members 106 and simultaneously or contemporaneously pressurize all of the pressurizable members 106 that are in fluid communication with one another. One example of this embodiment is described above with reference to FIG. 1B.

The fiber plies 104 may be laid up or arranged with a 45 degree bias, which permits the pressurizable member 106 to considerably expand during the cure process. Preferably, the arrangement of the fiber plies 104 and the configuration of the pressurizable members 106 cooperate to ensure compression of all fiber plies 104 and thus prevent wrinkles during the cure process.

Figure 4:
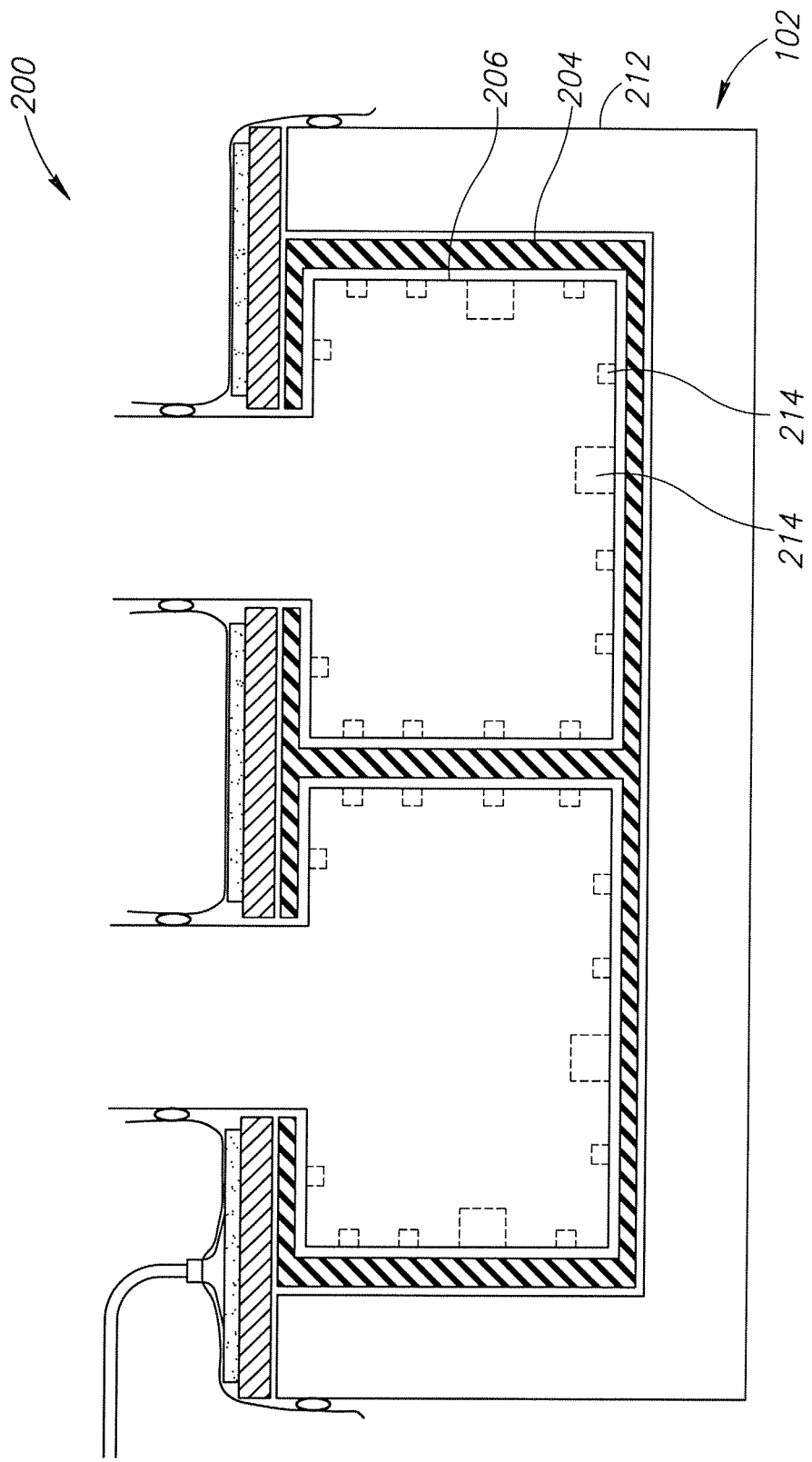
FIG. 4 schematically shows a method of making a complex shaped, three-dimensional composite structure in a mold where fiber plies are arranged on sufficiently rigid pressurizable members optionally having resin feeder grooves and pressurized within the mold using a bagging film according to an embodiment of the invention.

FIG. 4 shows an autoclave system 200 having a mold 202 comprising a mold body 212 without feeder grooves. Instead, the feeder grooves 214 are formed in the pressurizable members 206, which are configured to be removable from the fiber plies 204 after curing. The autoclave system 200, in most respects, is similar to the autoclave system 100 described above, with the only difference being that the feeder grooves 214 are formed in the pressurizable members 206. One purpose for forming the feeder grooves 214 in the pressurizable members 206 is to achieve a more desirable or more intricate matrix material distribution network. Another purpose for forming the feeder grooves 214 in the pressurizable members 206 is to reduce some of the complexity and cost of making the mold body 212. For example, when forming the matrix material distribution network in mold body 212, it is appreciated that lay-up scheme of the fiber plies 104 should be carefully thought out.

Figure 5:
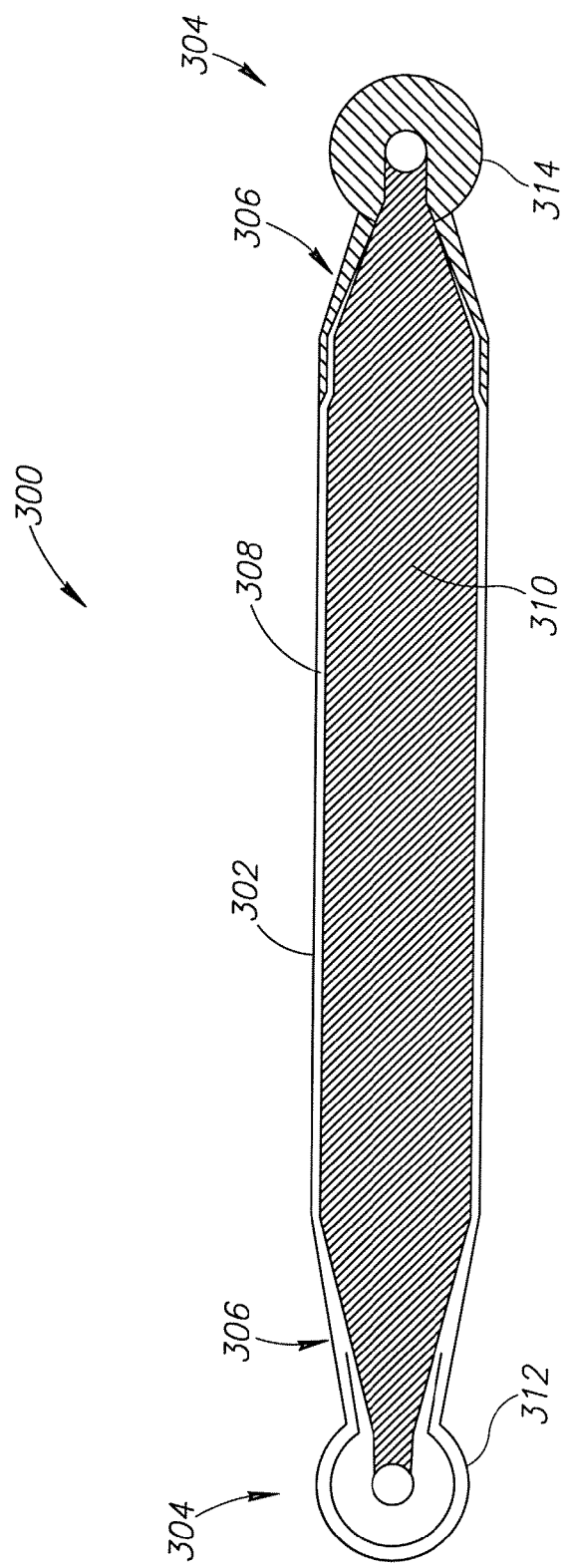
FIG. 5 shows a composite structure with fiber plies arranged on a pressurizable member to take the form of a drag link used on an aerospace vehicle according to an embodiment of the invention.

FIG. 5 shows an aerospace component 300, for example a drag link, which is a primary load path component that couples an engine nacelle to the rear spar of an airplane wing. As the engine creates thrust, load is directed through the nacelle, to the drag link 300, which transfers the load to the rear spar. Because a drag link 300 is hollow and includes a necked down configuration, it has not been possible to create this component using any of the known fiber-reinforced composite technologies given the space constraints and geometry of the drag link 300. Attempts to manufacture drag links 300 out of fiber-reinforced composite materials have been unsuccessful because it is difficult to attach metallic fittings on the ends of the composite drag links 300 because holes must be drilled in the ends of the drag link 300, but this significantly weakens the composite mating surface due to the "area out" from the drilled holes.

In the illustrated embodiment, the drag link 300 includes an elongated body 302 with fittings 304 at each end for attaching to the nacelle and rear spar, respectively. The elongated body 302, which includes the necked-down portions 306, comprises fiber plies 308 arranged on a "flyaway" pressurizable member 310. In one embodiment, the fittings 304 are fiber-composite fittings 312 integrally formed with the elongated body 302. In another embodiment, the fittings 304 are metallic fittings 314 bonded to the elongated body 302.

One method of producing the drag link involves obtaining the flyaway pressurizable member 310 and arranging pre-impregnated or un-impregnated fiber plies on the pressurizable member 310. Optionally, debulk cycles may be employed to compact the plies by vacuum bagging the plies at room or at a slightly elevated temperature. In addition and further optionally, metallic inserts may be assembled into the fiber plies. The metallic inserts may take the form of removable tooling components that are pinned or secured in place to create a controlled surface or they may be metallic fittings bonded in situ. The aforementioned steps may be repeated until the uncured drag link 300 is sufficiently complete.

In one embodiment, the uncured drag link 300 may be placed in a "clam shell" type mold and the pressurizable member 310 is connected to a pressure source. The mold is closed and sealed. The pressurizable member 310 is pressurized and subjected to curing energy, such as temperature, infrared, electron beam, ultraviolet radiation or another substantially equivalent curing process. After curing, the cured drag link 300 is removed from the mold, any excess matrix material may be removed using known techniques and process, and a finish or other type of protective coating may be applied to the cured drag link 300.

As described above, aspects of the invention enable the manufacture of complex-shaped fiber-reinforced composite structures that otherwise could not be produced or would require substantial advanced and expensive assembly techniques. In addition, aspects of the invention may allow for the manufacture of a complex-shaped fiber-reinforced composite structure having substantially reduced weight when compared to a similar metallic component, enable radical new designs and structural configurations, and may lower production costs of complex-shaped fiber-reinforced composite structures.

With any one of the embodiments described above, or some combination thereof, the flyaway component may be produced as a single, monolithic component or may be made in pieces or sections that are coupled together after each piece or section is pressurized and cured.

Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A method of making a composite structure, the method comprising:
    obtaining a plurality of pressurizable members each having a necessary amount of rigidity for supporting fiber plies thereon in a desired shape before pressurization, the pressurizable members each having an outer surface and an inner surface forming a wall that defines a volumetric region, each of the pressurizable members further having an opening to permit internal pressurization of each of the pressurizable members, wherein a plurality of pressurizable members are coupled together to be in fluid communication with an adjacent pressurizable member, and wherein the pressurizable members substantially maintain their desired shape without requiring an internal support member;
    arranging fiber plies on the outer surface of at least some of the pressurizable members, wherein each of the pressurizable members substantially maintains its respective, desired shape after being loaded with the fiber plies, yet before pressurization thereof;

placing the fibers plies and the pressurizable members into a mold;

sealing the fiber plies within the mold to permit pressurization of the fiber plies;

pressurizing a first surface of the fiber plies with a first pressure; and pressurizing the inner surface of each of the pressurizable members via the respective opening with a second pressure, wherein the first pressure and the second pressure cooperate to compress the fiber plies between the mold and the at least some of the pressurizable members.

2. The method of claim 1 wherein obtaining the pressurizable members includes obtaining the pressurizable members from the group consisting of a rotomolded thermoplastic members, a blow molded thermoplastic members, a superplastic formed metallic members, and a twin sheet vacuum formed members.

3. The method of claim 1 wherein arranging the fiber plies on the outer surface of the at least some of the pressurizable members includes laying individual fiber plies at angles relative to one another.

4. The method of claim 1 wherein arranging the fiber plies on the outer surface of the at least some of the pressurizable members includes covering only a portion of the outer surface of the at least some of the pressurizable members.

5. The method of claim 1 wherein arranging the fiber plies on the outer surface of the at least some of the pressurizable members includes bonding at least some of the fiber plies to the outer surface of the at least some of the pressurizable members.

6. The method of claim 1 wherein sealing the fiber plies within the mold includes sealing a bagging film with respect to the mold and with respect to the respective openings of the pressurizable members.

7. The method of claim 1 wherein sealing the fiber plies within the mold includes isolating the fiber plies from an ambient pressure.

8. The method of claim 1, further comprising infusing a matrix material into the fiber plies to sufficiently impregnate the fiber plies within the mold.

9. The method of claim 8, wherein infusing the matrix material includes infusing a resin in substantially liquid form.

10. The method of claim 8, wherein infusing the matrix material into the mold includes distributing the matrix material through feeder grooves formed in the mold.

11. The method of claim 8, wherein infusing the matrix material into the mold includes distributing the matrix material through feeder grooves formed in the pressurizable members.

12. The method of claim 1, wherein pressurizing the first surface of the fiber plies with the first pressure includes subjecting the first surface of the fiber plies to a vacuum.

13. The method of claim 1, wherein pressurizing the first surface of the fiber plies with the first pressure includes subjecting the first surface of the fiber plies to a pressure greater than one atmosphere.

14. The method of claim 1, wherein pressurizing the inner surface of the pressurizable members includes subjecting the inner surface of the pressurizable members to a vacuum.

15. The method of claim 1, wherein pressurizing the inner surface of the pressurizable members includes subjecting the inner surface of the pressurizable members to a pressure greater than one atmosphere.

16. The method of claim 1, wherein pressurizing the inner surface of the pressurizable members via the respective openings includes pressurizing the inner surface of the pressurizable members through a sprue.

\* \* \* \* \*